United States Patent [19]

Hendrick, Jr.

[11] Patent Number: 4,996,437
[45] Date of Patent: Feb. 26, 1991

[54] OPTICAL CLUTTER SCENE SIMULATOR

[75] Inventor: Roy W. Hendrick, Jr., Goleta, Calif.

[73] Assignee: Mission Research Corporation, Santa Barbara, Calif.

[21] Appl. No.: 262,510

[22] Filed: Oct. 25, 1988

[51] Int. Cl.$^5$ .............................................. G01D 18/00
[52] U.S. Cl. .............................. 250/252.1; 250/493.1; 250/504 R
[58] Field of Search .................. 250/252.1 A, 493.1, 250/504 R; 342/169

[56] References Cited

U.S. PATENT DOCUMENTS 4,625,209 11/1986 Lawrence et al. .................. 342/169

FOREIGN PATENT DOCUMENTS 3429410 2/1986 Fed. Rep. of Germany ... 250/252.1 A

Primary Examiner—Carolyn E. Fields
Attorney, Agent, or Firm—Donald D. Mon

[57] ABSTRACT

An optical clutter scene stimulator generates a scene simulating atmospheric optical clutter produced by a nuclear event. The stimulator focuses a display source scene on a focal plane, then displaces the scene from the focal plane so as to provide a scene representing optical clutter. Alternately, the optical clutter scene can be generated by performing an optical Fourier transform.

17 Claims, 2 Drawing Sheets

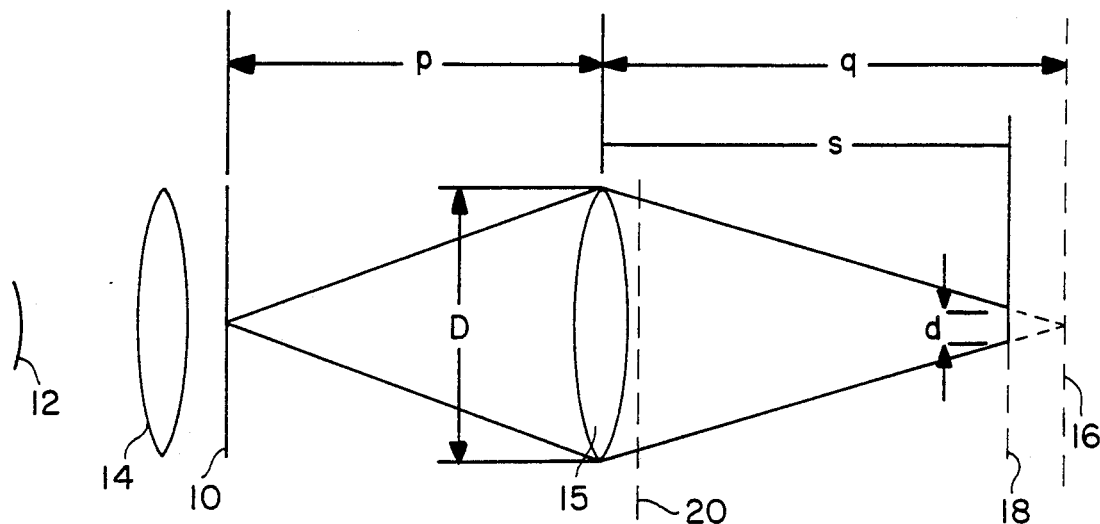
FIG. 3
FIG. 4
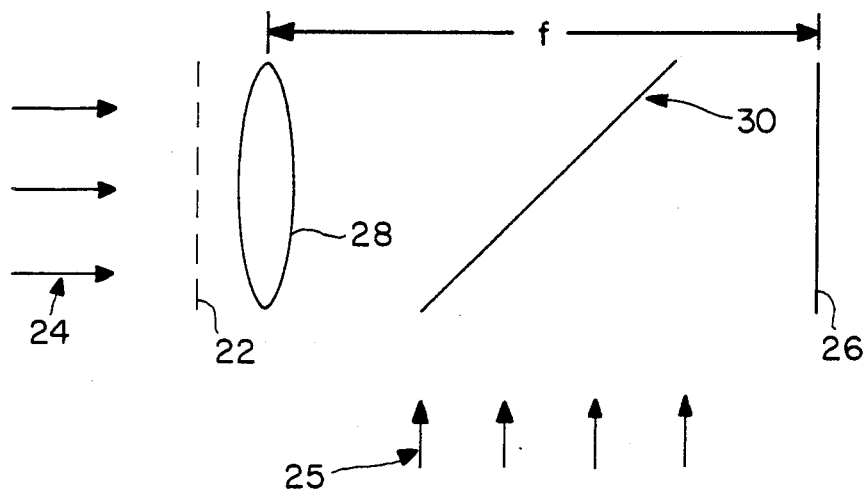

even though the source display used to generate the scene does not have the required precision.

OPTICAL CLUTTER SCENE SIMULATOR

FIELD OF THE INVENTION

This invention relates to a system for generating a scene simulating atmospheric optical clutter produced by a nuclear event and more particularly relates to an optical clutter simulation system that compensates for the uncertainty of source display radiance.

BACKGROUND OF THE INVENTION

As optical sensors for target acquisition and tracking improve there is a need for systems and procedures for testing the sensors to ensure operability and reliability in the selected environment. The optical clutter created by excitation of the atmosphere by a nuclear event is one of the most stressful environments conceivable for successful function of such sensors. Therefore test equipment and systems which project realistic representations of such scenes are essential to test the efficient functionability of such sensors, because no real-experience tests can exist. Accurate scene simulators must be used to explore the complete range of operability and performance of such sensors.

A problem with generating such scenes is that a realistic scene must have spatial resolutions according to the clutter model defined by government specifications. A structure on the required resolution scale of the defined clutter model without interference by source display noise is difficult to attain with current display technology. Background suppression techniques which filter out much of the large scale, low spatial frequency structure while emphasizing the fine structure only aggravate the problem. Obtaining good performance in a nuclear environment makes background supression mandatory and is the main reason for producing simulated optical clutter scene displays.

Current sources for producing displays do not have the required precision to create the necessary pixel-to-pixel radiance variations. A simplified optical processor that could produce a scene with the desired optical characteristics from a source scene having less than the required precision would be advantageous.

It is therefore one object of the present invention to provide a simple optical processor for producing a scene with the desired optical clutter from less than a precision source scene.

Yet another object of the present invention is to produce an optical clutter scene simulating the atmospheric excitation of a nuclear event.

Still another object is to provide a realistic presentation of optical clutter for testing the efficiency and operability of sensors in an atmospheric disturbance.

Another object of the present invention is to produce a optical scene more closely simulating the clutter of a nuclear event than can a direct display, at least as defined by specifications.

Still another object of the present invention is to produce an optical scene providing an accurate, realistic simulation of clutter in the atmosphere from a nuclear event while suppressing the imperfections of the source display.

BRIEF DESCRIPTION OF THE INVENTION

The purpose of the present invention is to provide an improved simulation of atmospheric optical clutter from a nuclear event while reducing the effects of background imperfections or noise from a display source.

A scene is produced from a source display having a spatial variable radiance processed by optics to project the desired scene. The source display can be any number of devices which can provide the desired spatial structure in the omitted or transmitted radiance. The source display radiance must also be adequate for the generated scene and cone of emission to fill the tested sensor convergence cone. Suitable display sources might be illuminated infrared transparencies, temperature controlled variable heater plates, resistive heater arrays, light emitting diodes (LEDs), Blye cells, and liquid crystal displays (LCDs) any of which, of course, must satisfy the radiance distribution requirements. The invention will be described in forms of infrared transparencies as they are very practical and currently available. An advantage in using an illuminated infrared slide for the display is the ability easily to vary the illumination source intensity. Filters, aperture stops or black body temperature control can be used to obtain the desired variance of mean radiance over the scene. Further the transparency used can be translated to simulate convection in the clutter scene.

The present invention provides an optical clutter scene generator for realistically simulating a predefined model by explicit representation of a source scene and optical processing of controlled noise. A source scene that has explicit large scale features (low spatial frequencies) is used with high frequency noise superimposed on it. The desired composite spectrum is obtained by using spatial autocorrelation to roll off the high frequencies.

An optical clutter scene generator meeting the statistical requirements has a radiation source illuminating a transparency through a condenser lens.

The radiant energy from the transparency passes through an optical processing lens and is distributed at a plane by a correlation function control screen. The correlation function control screen may be circular aperture or a screen of varying opacity which produces the statistically desired optical clutter scene displaced from the focal plane of the optical processing lens. This arrangement produces a scene which is essentially out of focus having the most commonly used optical clutter statistics without requiring a difficult-to-obtain high precision in the source display.

The above and other features of this invention will be fully understood from the following detailed description and the accompanying drawings, in which:

BRIEF DESCRIPTION OF THE DRAWINGS

FIG. 3 is a diagram of an optical clutter scene generator according to the invention.

FIG. 4 is a diagram of an alternative system for generating an optical clutter scene.

DETAILED DESCRIPTION OF THE INVENTION

The present invention is designed to create or generate an optical clutter scene which will have the spatial structure and resolution of the government accepted clutter model. The system can provide optical clutter scenes having a wide range of statistics that cover those most commonly thought to simulate optical clutter in an excited atmosphere caused by a nuclear event. Such a scene generator is essential to the successful testing of the efficiency of advanced strategic defense sensors, such as infrared sensors, in a nuclear clutter environment.

A scene with clutter having the spatial structure statistics is specified by the government as defined in terms of the spatial power spectral density (PSD) at the cluttered medium represented by:

$$PSD(k_x k_y) = \frac{4\pi\sigma^2 L_x L_y A(m,n)}{[1 + (L_x k_x)^2 + (L_y k_y)^2]^m [1 + (l_x k_x)^2 + (l_y k_y)^2]^{n-m}} \quad (1)$$

$k_x$ and $k_y$ are spatial frequencies (radians/km)
$\sigma^2$ is the variance of radiance
$L_x$ and $L_y$ are outer scales lengths (km)
$l_x$ and $l_y$ are freezing scale lengths (km)
m and n are related to the spectral index
A(m,n) is a normalizing perameter.
A is 1 if m=2=n. The PSD has been normalized as a fractional radiance variation. Thus, the power spectral density of total radiance is $\bar{J}^2$ PSD($k_x k_y$) where $\bar{J}$ is the mean radiance.

In most cases, within the precision of the model, m can be taken to be 2, and for most optical system analysis, n=m provides a reasonable approximation. At late times (after a few minutes), fireballs above about 100 km will striate along geomagnetic field lines so that the outer scale along the field is much greater than that across. However, in the case of lower fireballs and multiburst environments, the assumption of isotropic clutter ($L_x = L_y$) is appropriate.

In view of these considerations, the spatial structure can be defined by equation (2):

$$PSD(k_x k_y) = \frac{4\pi\sigma^2 L_x L_y}{[1 + (L_x k_x)^2 + (L_y k_y)^2]^2} \quad (2)$$

with $L_y$ equal to $L_x$ in the case of isotropic clutter or being much greater than $L_x$ in the case of striations.

A precision problem arises because it may be necessary to generate a scene with pixels (denoted here p) representing regions only 100 meters square in scenes with an outer scale of 3 to 10 km. Thus, structure frequencies corresponding to $k_x = \pi/p$, which may be as large as 30 km$^{-1}$, must be represented in a scene with $L_x$ as large as 10. The structure at spatial wavelengths of concern may contain as little as $10^{-10}$ as much spectral power as an equal wavelength interval near $k_x = 0$.

Figure 1:
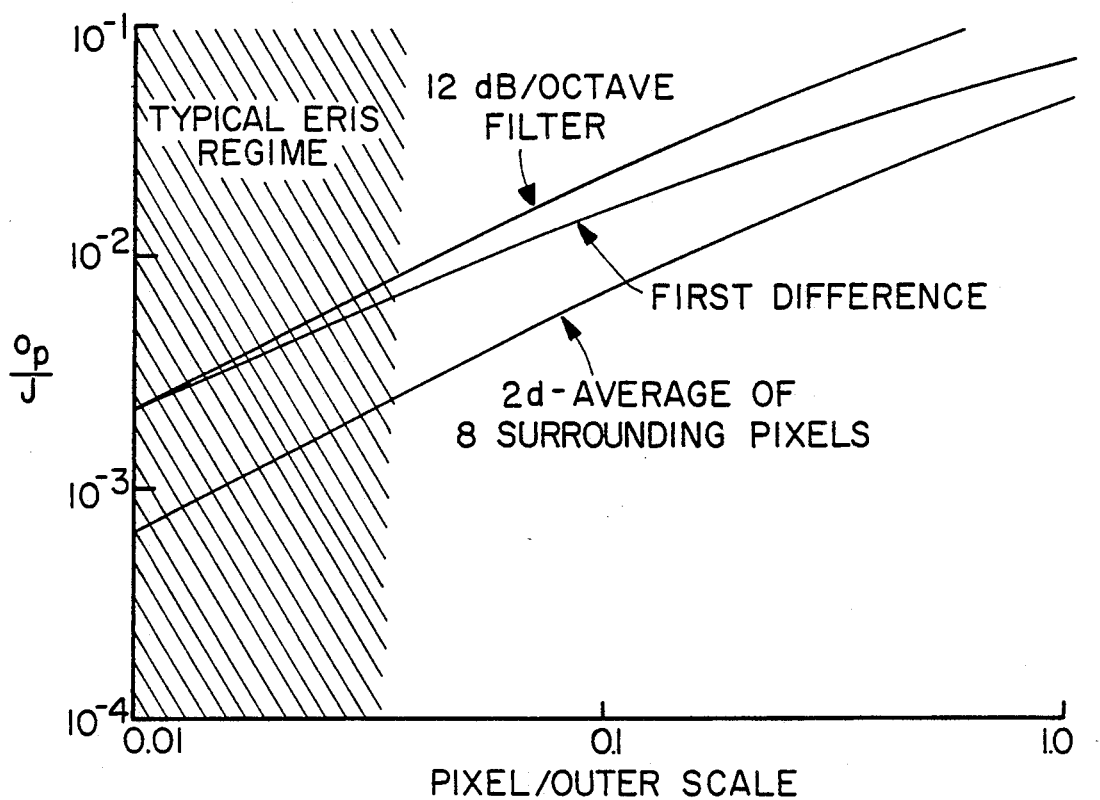
FIG. 1 is a graph illustrating clutter noise passed by a processor.

The problem is emphasized by the frequency response of typical background suppression algorithms. Transfer functions have been written to compute the clutter power that would pass various processes. The product of these functions and the desired PSD were numerically integrated to determine the maximum allowed scene noise level. The result of three processes is shown in FIG. 1. The three processes are 1. an ordering process (i.e., the difference of two adjacent pixels), 2. a 12 dB/octave low frequency roll off with a spatial exponentiation distance (time constant) of 1.5 pixels, and 3. two-dimensional background suppression using the average of 8 surrounding pixels as the background estimator. The PSD used was that of equation (2) with isotropic clutter ($L = L_y = L_o$) and with $\sigma^2 = 10^{-2}$. For typical nuclear environments, current modeling has $\sigma^2$ in the range of about 0.002 to 0.04. The problem has been normalized in terms of the ratio of the pixel size to the outer scale length. To achieve good operability (sensitivity) in a nuclear environment, it is necessary to design equipment to operate in the regime of 0.01 to 0.03 for p/$L_o$. Thus, the clutter noise passing the processing has a standard deviation of the order of $10^{-3}$ of the mean radiance as shown in FIG. 1.

The uncertainty of the source display radiances caused by the precision with which it can be generated can be described in terms of a noise contribution. Let this uncertainty have a standard deviation $\Delta$(a fraction of the mean radiance). It follows directly that the noise in the ordering process or difference between two pixels has a standard deviation $\sqrt{2}\Delta$, in the 12 dB/octave filter output, $\sqrt{2.07}\Delta$, and in the two-dimensional background suppressor, $\sqrt{9/8}\Delta$. If this scene noise is required to be no greater than half the standard deviation of the processed clutter, so that the noise does not interfere with evaluation of processor performance, the required precision is obtained (or maximum allowed noise) in the source scene display shown in FIG. 2.

Figure 2:
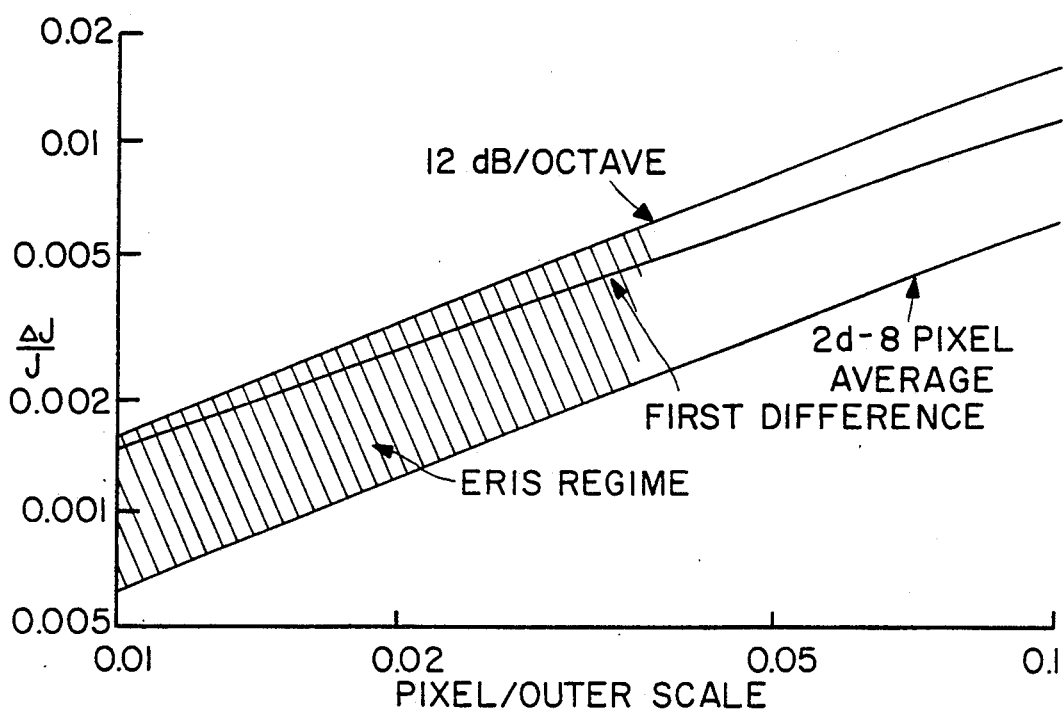
FIG. 2 is a graph illustrating the source display precision radiance required to obtain the desired spectrum.

The data shown in FIG. 2 indicates that, for the regime shown, a precision as good as one part in a thousand may be needed. A precision of a few parts per thousand is certainly required and such precision is not currently available with current state of the art sources and displays.

A system for producing no (or at least minimal) optical clutter scenes required with less precision requirement at the source is shown in FIG. 3. Source scene 10 is illuminated by a radiation source 12 focussed by condenser lens 14. Source scene 10 (Source Display Slide) would have a radiance formed pixel by pixel as the sum of a component precomputed to have the desired low frequency radiance and a random noise variate. In the generation of a scene with $L_o = 10$ km, p=0.1 km and $\sigma^2 = 0.01$. In the standard deviation of the low frequency clutter structure would be only slightly less than 10% of the mean value. If the noise variate also had a 10% rms standard deviation, white noise would dominate the scene at spatial wave frequencies above about 2 rad/km.

A spatial correlation function that rolls the high frequencies off as $1/k^3$ (in one dimension) is then needed. In terms of obtaining the total desired variation it is not possible in terms of obtaining a suitably great standard deviation. However, for representing only the high frequency portion of the spectrum, it is practical. The desired spatial correlation function is a circle, which is easily obtained by operating the system a specific amount out of focus. An out of focus image in terms of spatial frequency transfer functions is discussed in Wolfe, W. L. and F. J. Zisis, ed. "The Infrared Handbook" Office of Naval Research, Dept. of the Navy, Washington D. C. (1983) as having the $J_1(I)/I$ Bessel function behavior.

As shown in FIG. 3, projector lens 15 would image the source scene at focal plane 16, where $$\frac{1}{q} = \frac{1}{f} - \frac{1}{p}. \quad (3)$$

However, the scene is actually used in scene plane 18 which is slightly separated from focal plane 16. If correlation function control screen 20 comprises a simple circular aperture of diameter d, the radiation from a point in the source is spread over a circle of diameter d, the radiation from a point in the source is spread over a circle of diameter:

$$d = D\frac{q-s}{q}. \qquad (4)$$

Conversely, the radiation at a point in scene plane 18 is the average of source display or scene 10 over a circle of diameter d p/q which is the spatial convolution of source scene 10 with a circle.

Control of the amount of defocussing adjusts the extent of the correlation (convolution) function and, hence, where it starts to roll the spectrum off. In the example used, correlation function control screen 20 would have a diameter corresponding to approximately 3.2 km. For a typical system, this implies a separation of a several millimeters between the scene plane 18 and focal plane 16.

The reason for the relaxed precision requirement of the source display is now ready to see. The radiance at a point in a test scene is the average of perhaps several hundred in source scene 10 (800 for this example) so that any imprecision is reduced by the square root of the number of averaged points (assuming the imprecision is a random function). If the precision of producing a specified pixel radiance were 0.01 $\bar{J}$, the pixel to pixel noise in optimally processed scene at scene plane 18 would be about $3 \times 10^{-4} \bar{J}$, which is adequate for test purposes.

A more complex PSD, such as that of equation (1) with an added roll-off above the freezing scale with n=m+2, for instance, can be obtained by replacing the clear circular aperture of correlation function control screen 20 with a screen of varying opacity.

If transmission of correlation function control screen 20 is a function of the radius "r" from the center and is given by:

$$T = \begin{cases} 1 & r < r_1 \\ 1 - \frac{r - r_1}{r_2 - r_1} & r_1 < r < r_2 \\ 0 & r_2 < r \end{cases} \qquad (5)$$

the desired additional freezing scale breakpoint of equation (1) will be obtained with $l_x = l_y$). The spatial frequency of the freezing scale break point is determined by a combination of the ratio of $r_2 - r_1$ to $r_2$, the amount of defocussing and scaling parameters of the projection system.

The scene projector/generator described has the capability of simply producing a scene with the most commonly used nuclear optical clutter statistics, without requiring high precision in the source or the production of a source display. Moreover, it has the potential of providing scenes with a wide range of statistics covering those commonly thought to describe nuclear optical clutter. The implementation of this potential is straightforward, requiring only the modification of correlation function control screen 20, not the projection hardware.

An alternate but less preferred embodiment of the concept is shown in FIG. 4. An optical clutter test scene can be generated by performing an optical Fourier transform. By starting with a source display that is the Fourier transform of the desired physical scene, the desired scene is generated because a Fourier transform is its own inverse.

A Fourier transform processor is shown schematically in FIG. 4. Fourier scene screen 22 must be a scattering screen such that light indicated at 24, 25 (radiation) from any point on the screen uniformly illuminates display plane 26. Display plane 26 is at the focal plane of the lens 28 (or mirror).

If the electric field strength at the Fourier scene is $E(\xi,\eta)$, where $\xi$ and $\eta$ are cartesian coordinates, the field in display plane 26 is approximately:

$$E(x,y) = E_r + \int_\xi \int_\eta E(\xi,\eta) \exp[i2\pi(\xi x + \eta y)/f\lambda] d\xi d\eta \qquad (6)$$

where $E_r$ is the strength of the reference beam added by means of beam splitter 30. Thus if intensity of reference beam 25 is considerably greater than the Fourier transform intensity both the field strength and the intensity are transforms of the Fourier screens. The dimensional scaling is that $x = S_x F/R$ where $S_x$ is the linear dimension at the source of the clutter which is assumed to be a distance R from a sensor with focal length F. THe Fourier screen point $\xi$ corresponds to a spatial frequency $k_x$ given by $\xi = f\lambda R k_x/F$ where $\lambda$ is the wavelength used in the reconstruction.

Shortcomings of this technique are that the reconstruction must be accomplished monochromatically, the illumination source must be very bright and a large dynamic range is required in the Fourier scene. One can conceive of the Fourier scene as being the combination of two screens in series—one a white noise screen and the other a purely transmissive screen of variable opacity. The transmission at large values of k (the ones that produce the high frequency noise) must be about 8 to 10 orders of magnitude less than at zero. This can cause manufacturing problems and stray light control problems. The area of the Fourier scene through which most of the scene radiation light passes contains about $10^{-4}$ to $10^{-5}$ of the scene area. Thus, incident radiation intensity 24 must be four to five orders of magnitude greater than the mean intensity of the scene to be created.

One possible solution is to illuminate a Fourier scene that comprises white noise, with a beam that has been diffracted through a circular aperture. The pattern, a Bessel function $(J_1(x)/x)$, has the proper one-dimensional $1/k_z^3$ high frequency characteristics. There are nulls in the pattern and it might be hard to get good pattern control so far from the center of the diffraction pattern due to strong light.

A modification of Fourier transfer processing of FIG. 4 eliminates reference signal 25 injected with beam splitter 30. In this case, the intensity in the display plane is the Fourier transform of the autocorrelation function of the "fourier" scene.

This invention is not to be limited by the embodiments shown in the drawings and described in the description, which are given by way of example and not of limitation, but only in accordance with the scope of the appended claims.

I claim:

1. A system for generating a scene representing optical clutter of an atmospheric disturbance for testing the efficiency of object detecting sensors comprising:
a display source scene means;
means for projecting said display source scene means;
means focusing the projected display source scene means at a focal plane;

correlation function control means for producing an optical clutter display from said display source scene means on a plane displaced from said focal plane, whereby the effects of noise in generating said optical clutter display are substantially eliminated.

2. The system according to claim 1 in which said display source scene means comprises; a transparency having the scene to be displayed; and means illuminating said transparency through a condenser lens.

3. The system according to claim 2 in which said transparency is an infrared transparency.

4. The system according to claim 1 in which said display source scene means comprises; a resistive heater array.

5. The system according to claim 1 in which said display source scene means comprises; an array of light emitting diodes.

6. The system according to claim 1 in which said display source scene means comprises a liquid crystal display.

7. The system according to claim 1 in which said correlation function control means comprises; a correlation function control screen having at least one aperture between a projection lens and said focal plane.

8. The system according to claim 7 in which said correlation function control screen aperture is circular.

9. The system according to claim 7 in which said correlation function control screen comprises a screen of varying opacity.

10. A system for generating a scene representing optical clutter of an atmospheric disturbance for testing the efficiency of object detecting sensors comprising:
a display source scene means;
means for projecting said display source scene means;
means for generating an optical Fourier transform at a display plane;
said means for generating an optical Fourier transform including a light source and a Fourier light scattering scene screen.

11. The system according to claim 10 in which said light source is a coherent light source.

12. The system according to claim 11 including a reference light beam, and means for combining said reference light beam with a beam from said light source passing through said scattering scene screen.

13. The system according to claim 12 in which said reference light beam comprises a coherent light beam; said reference light beam being formed by an optical beam splitter.

14. A method of generating a scene representing optical clutter of an atmospheric disturbance for testing the efficiency of object detecting sensors comprising:
producing a display source scene;
projecting said display source scene;
focusing said display source scene on a focal plane; and
displacing said display source scene from said focal plane so as to provide a scene representing an optical clutter scene;
whereby the effects of noise in projecting said display source scene are substantially eliminated.

15. The method according to claim 14 in which said optical clutter scene is displaced by passing it through an optical correlator screen having at least one aperture.

16. The method according to claim 15 in which said optical clutter scene is passed through an optical correlator screen having a circular aperture.

17. The method according to claim 15 in which said optical clutter scene is passed through an optical correlator screen of varying opacity.

* * * * *